United States Patent Office 3,102,904
Patented Sept. 3, 1963

3,102,904
1,3-DIHALO-2 ACYLOXY-2-PHENYL PROPANE AND METHOD OF PREPARING SAME
Willis C. Keith, Lansing, and Robert P. Zmitrovis, Park Forest, Ill., assignors to Sinclair Research, Inc., Wilmington, Del., a corporation of Delaware
No Drawing. Filed Nov. 20, 1961, Ser. No. 153,672
6 Claims. (Cl. 260—488)

This invention is 1,3-dihalo-2-acyloxy-2-phenyl propane and a method for its manufacture. The compound is useful as a solvent for a number of resins and other polymers of high molecular weights that are ordinarily insoluble in most organic solvents, for example, acrylonitrile polymers and copolymers containing OH or COOH groups. As such, these solvents can be used in forming films and protective coatings from these resins. In addition, this compound is useful as a gasoline octane enhancer and lead scavenger.

The ester has the general formula:

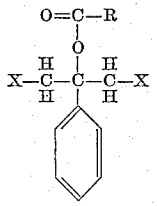

wherein R is hydrogen or a monovalent hydrocarbon radical, substituted or unsubstituted, straight, branched or cyclic, including aromatic, of 1–20 carbon atoms. Preferably R is alkyl, advantageously lower alkyl, for example, of 1–4 or more carbon atoms. X is halogen of atomic number 17 to 35, preferably chlorine, and the phenyl group may be substituted, as with one or more lower alkyl groups. An important advantage of the ester is its thermal stability. This is surprising since cumyl acetate and similar compounds are very unstable.

The ester can be made from 1,2,3-trichloro phenyl propane, which in turn may be produced from alpha-methyl styrene, for example as disclosed in our copending application Serial No. 60,117, filed October 14, 1961 now abandoned and incorporated herein by reference. The trihalopropane is reacted with, for instance, an equimolar amount of the ammonium or equivalent, e.g., alkali metal, salts of the monocarboxylic acid containing the desired acyl group, that is the acid of 2–21 carbon atoms, at an elevated temperature of about 50 to 150° C. and a pressure sufficient to maintain the liquid phase. Generally, also, a liquid solvent is employed in the reaction which may conveniently be an inert hydrocarbon but preferably is a carboxylic acid having the desired acyl group. In a batch process the time of the reaction is generally about 10 to 30 hours but in any event is sufficient to give a substantial yield of desired product. A large excess of the ammonium or alkali metal salt may be used, or less than the stoichiometric amount may be employed. No substantial amount of dehydrohalogenation of the trihalo propane occurs in the reaction.

The following example of this invention is to be considered illustrative only and not limiting:

A three-neck flask equipped with a condenser, stirrer and thermowell was charged with 73 grams of 1,2,3-trichloro-2-phenyl propane, 65 grams of ammonium acetate and 300 grams acetic acid. The mixture was heated to 45° C. and the temperature maintained for two hours. The mixture was then allowed to reflux at 120° C. for 18 hours at about atmospheric pressure. The reaction product, 1,3-dichloro-2-acetoxy-2-phenyl propane, was worked up by allowing the reaction mixture to cool to room temperature and removing the NH₄Cl by filtration. The filtrate was treated with water to form two phases, the organic phase of which was washed with water, dried and fractionated. The 70 gram product had the following characteristics:

| | Found | Theory |
|---|---|---|
| Boiling point, °C., at 2 mm | 99±1 | |
| Refractive index n 25/d | 1.5510 | |
| Percent C | 53.7 | 53.5 |
| Percent H | 4.8 | 4.85 |
| Percent Cl | 28.9 | 28.7 |

Fractionation was performed on a spinning band column and infrared analysis verified the ester group and lack of unsaturation.

It is claimed:
1.

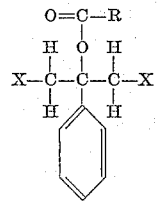

wherein R is a hydrocarbon radical of 1–20 carbon atoms and X is halogen of atomic number 17 to 35.
2. The compound of claim 1 where X is chlorine.
3. The compound of claim 2 where R is lower alkyl.
4. 1,3-dichloro-2-acetoxy-2-phenyl propane.
5. A method which comprises reacting 1,2,3-trihalo-2-phenyl propane with the ammonium salt of an organic monocarboxylic acid of 2–21 carbon atoms at a temperature of about 50 to 150° C. to produce

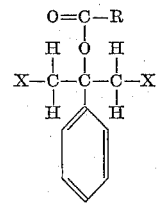

wherein R is the hydrocarbon residue of the acid and X is halogen of atomic number 17 to 35.
6. A method which comprises reacting 1,2,3-trichloro-2-phenyl propane with the ammonium salt of an organic monocarboxylic acid of 2–21 carbon atoms at a temperature of about 50 to 150° C. to produce

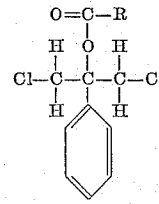

wherein R is the hydrocarbon residue of the acid.

References Cited in the file of this patent
UNITED STATES PATENTS
2,293,775 Soday _____ Aug. 25, 1942
2,315,557 Soday _____ Apr. 6, 1943
2,606,213 Ladd et al. _____ Aug. 5, 1952
2,980,732 Girard et al. _____ Apr. 18, 1961

OTHER REFERENCES
Chem. Abst., vol. 38, 4919′ (1944).